United States Patent [19]

Francis

[11] Patent Number: 5,273,827
[45] Date of Patent: Dec. 28, 1993

[54] COMPOSITE ARTICLE AND METHOD

[75] Inventor: Gaylord L. Francis, Painted Post, N.Y.

[73] Assignee: Corning Incorporated, Corning, N.Y.

[21] Appl. No.: 823,697

[22] Filed: Jan. 21, 1992

[51] Int. Cl.$^5$ ............................................. B32B 17/06
[52] U.S. Cl. ................................... 428/426; 428/428; 428/446; 428/469; 428/471; 428/472; 501/53
[58] Field of Search ............... 428/469, 471, 472, 426, 428/446, 428; 501/53, 55, 68, 69, 72, 7, 2, 4

[56] References Cited

U.S. PATENT DOCUMENTS

| | | | |
|---|---|---|---|
| 2,920,971 | 1/1960 | Stookey | 501/2 |
| 3,157,522 | 11/1964 | Stookey | 501/7 |
| 3,397,278 | 8/1966 | Pomerantz | 357/73 |
| 3,417,459 | 12/1968 | Pomerantz | 357/73 |
| 3,589,965 | 6/1971 | Wallis | 357/73 |
| 3,595,719 | 7/1971 | Pomerantz | 357/54 |
| 4,018,612 | 4/1977 | Chyung | 501/4 |
| 5,084,328 | 1/1992 | Fine | 428/428 |

OTHER PUBLICATIONS

"Field Assisted Glass–Metal Sealing", Wallis, G., Pomerantz, D.; *J. Appl. Phys.*, 40, 10, (1969), 3946–49.
"Electrode Phenomena . . . Glass", Albaugh, K., *J. Electrochem. Soc.*, 138, 10 (1991), 3089–94.

*Primary Examiner*—Ellis P. Robinson
*Assistant Examiner*—Timothy M. Speer
*Attorney, Agent, or Firm*—M. M. Peterson

[57] ABSTRACT

A composite article comprising a silicon body and a glass body bonded directly thereto by electrostatic bonding. The glass composition consists essentially of oxides of silicon, aluminum, and lithium, and the glass has a coefficient of thermal expansion approximating that of silicon, etches at a rate of at least 100 mg/cm$^2$ in 20 minutes in 48% HF, and may be electrostatically bonded to silicon at a voltage not over 1,000 volts/mm of glass thickness at a temperature not over 440° C.

4 Claims, No Drawings

COMPOSITE ARTICLE AND METHOD

FIELD OF THE INVENTION

The field is a composite body composed of a glass body directly bonded to a silicon body by electrostatic bonding.

BACKGROUND OF THE INVENTION

Direct bonding refers to the uniting of two bodies without an intermediate to act as a sealant. The direct bonding of an electrically conductive metal, such as silicon, to an insulator, such as a glass, is variously known as anodic bonding, electrostatic-bonding, or field-assisted bonding. It is also sometimes referred to as Mallory bonding, since the process was developed by personnel at P. R. Mallory & Co., Inc.

Direct bonding of a glass to a metal, such as silicon, is a low temperature process that is carried out below the glass softening point. It involves bringing a glass body and a metal body into close contact, and applying an electric potential across the two bodies. An electric current passes through the bodies and an electrostatic field is created, thereby effecting bonding of the bodies.

Electrostatic bonding has found a variety of applications where bonding at a low temperature is critical, or at least highly desirable. In particular, it avoids the distortion that tends to occur when a glass softens during fusion sealing. It is also very useful where metal elements are present that may be degraded or damaged by excessive heating.

Currently, there is considerable interest in using the technique in the fabrication of pressure sensors and accelerometers embodying insulated silicon elements. Among the important properties required of an insulating glass to be used in this way are:

1. An expansion match to silicon. This generally means a glass having a coefficient of thermal expansion (CTE) of $32-40\times10^{-7}/°$ C., preferably $34-38\times10^{-7}/°$ C.

2. Mild bonding conditions, that is, voltages below 1,000 volts/mm of glass thickness and a bonding temperature below 440° C.

3. Reasonable glass etchability rate, e.g., removal of at least 100 mg/cm$^2$ of glass in 20 minutes with 48% by weight HF.

Various glasses, including borosilicates, aluminosilicates and quartz, have been suggested for use in electrostatic bonding to different metals. The process was developed using a borosilicate glass, Corning Code 7740, in conjunction with silicon. In spite of problems, it is still current practice to use either Corning Code No. 7740 or Code No. 7070, both borosilicates, in electrostatic bonding to silicon.

Code 7740 does not provide a good expansion match to silicon and etches at a relatively slow rate. These problems are ameliorated when Code 7070 is used, but bonding has proven difficult. Thus, at least 4,000 volts per mm of glass are required together with a temperature of 450° C. It is apparent that a glass having improved properties for use in electrostatic sealing to silicon would be very desirable. It is a basic purpose of my invention to meet this need.

SUMMARY OF THE INVENTION

One aspect of the invention is a composite article comprising a silicon body and a glass body bonded directly to the silicon body. The glass composition consists essentially of oxides of silicon, aluminum, and lithium; which glass has a coefficient of thermal expansion (CTE) that closely matches that of silicon, is etched by 48% HF at a rate of at least 100 mg/cm$^2$ in 20 minutes, and may be electrostatically bonded to silicon at a voltage not over 1,000 volts/mm and at a temperature not over 440° C. In preferred embodiments, the glass has a CTE of about $34-38\times10^{-7}/°$ C., etches at a rate of at least 150 mg/cm$^2$, and has a resistivity of not over $10^6$ ohms/cm as measured at 350° C. Preferably, the glass composition, in calculated weight percent on an oxide basis, consists essentially of 62–72% $SiO_2$, 15–24% $Al_2O_3$, 0–4% MgO, 2–4.5% $Li_2O$, 0–2% ZnO, 0–5% $TiO_2$, 0–3% $ZrO_2$ and 0–2% $As_2O_3$ and/or $Sb_2O_5$.

A further aspect of the invention resides in a method of producing a composite article composed of a glass body and a silicon body directly bonded thereto. The method comprises forming the glass body from a glass having a composition consisting essentially of oxides of silicon, aluminum, and lithium, having a CTE closely matching that of silicon, being etched by 48% HF at a rate of at least 100 mg/cm$^2$, and electrostatically bonding the glass body to the silicon body at a voltage not over 1,000 volts/mm of glass and at a temperature not over 440° C. In one preferred embodiment, the glass composition, in calculated weight percent on an oxide basis, consists essentially of 62–72% $SiO_2$, 15–24% $Al_2O_3$, 0–4% MgO, 2–4.5% $Li_2O$, 0–2% ZnO, 0–5% $TiO_2$, 0–3% $ZrO_2$ and 0–2% $As_2O_3$ and/or $Sb_2O_5$. In another embodiment, the glass and silicon bodies are electrostatically bonded together at a voltage of about 500 volts/mm and a temperature of about 400° C.

PRIOR ART

The following United States patents and technical literature provide relevant information:

U.S. Pat. No. 3,397,278 (Pomerantz) discloses direct bonding of an insulator and a metal. The bond is effected by placing the elements in close contact, heating the insulator to a temperature below its softening point, and passing a low electric current through the composite. This results in a bonding region or zone between the insulator and metal that effects a strong seal. Boro-silicate glasses and silicon are among the insulator materials and metals suggested.

U.S. Pat. No. 3,417,459 (Pomerantz et al.) describes an improvement whereby the potential distribution characteristics of the insulator are predetermined, and this information is used in selecting the bonding circuit.

U.S. Pat. No. 3,589,965 (Wallis et al.) describes use of the Pomerantz process to bond together two insulators through a metal film applied to a surface on one of the insulators.

U.S. Pat. No. 3,595,719 (Pomerantz) discloses a process for bonding an insulator to a passivating layer on a semiconductor device. The passivating layer to be bonded is etched. It is thereafter bonded to the insulator by application of heat and electric potential thereto.

The direct bonding process is further described in an article by Wallis and Pomerantz in the September, 1969 (Vol. 40, #10) issue of *Journal of Applied Physics*.

A recent article by K. B. Albaugh in *Journal Electrochemical Society*, pp. 3089–94, Vol. 138 #10 (1991) describes studies on electrode phenomena during electrostatic (anodic) bonding of silicon to sodium borosilicate glass.

Lithium aluminosilicate glass-ceramics, and their precursor glasses, are the subject of numerous patents. Typical United States Patents are U.S. Pat. No. 2,920,971 and U.S. Pat. No. 3,157,522 (Stookey) and U.S. Pat. No. 4,018,612 (Chyung). These patents disclose glasses composed essentially of $Li_2O$, $Al_2O_3$ and $SiO_2$. The glasses may also contain alkaline earth metal oxides, including MgO, CaO, and BaO, and ZnO in small amounts as modifiers.

DESCRIPTION OF THE INVENTION

The present invention arose from a search for a glass that would provide a more suitable combination of properties for electrostatic bonding of the glass with a silicon metal body. As noted earlier, properties of particular importance include expansion match, mild bonding conditions and high etchability rate.

Silicon metal has a coefficient of thermal expansion of about $35.3 \times 10^{-7}/°$ C. over the temperature range of 25° to 400° C. Therefore, a suitable glass for bonding should normally have a CTE in the range of $32-40 \times 10^{-7}/°$ C. Within this range, a value above $35.3 \times 10^{-7}/°$ C., the value for silicon, will normally be more acceptable, because it will develop a slight compression in a seal.

The glass should be such that it may be bonded under mild bonding conditions to produce a strong seal. This means operating with both the applied voltage and the glass temperature as low as feasible. Preferably, an applied voltage should not exceed 1,000 volts/mm with the bonding temperature not over 440° C.

It is well recognized that extreme care must be exercised in any operation involving high voltage. Hence, it is advantageous to employ as low an applied voltage as is operative. Accordingly, a goal of less than 1,000 volts/mm of glass thickness was set.

Likewise, it is well known that metal components may be physically damaged, or have their electrical properties degraded, at elevated temperatures. Also, glass may distort as it softens. The latter is a matter of great concern where precise form and/or dimensions are critical in a product. This has led to establishment of an upper limit of 440° C. as the bonding temperature for a new glass.

Finally, the glass should have a reasonably high etchability rate, while still being a stable glass. A stable glass must be resistant to dissolution in water and/or other liquids encountered in processing and service. It must also be resistant to attack by ambient agents. At the same time, the glass must be capable of being fluoride etched at a relatively high rate. This permits thinning a glass coating, such as a passivating layer, so that easier bonding can be attained.

As noted earlier, the principal glasses presently used in commercial applications are borosilicate glasses, more particularly, Corning Codes No. 7740 and No. 7070. The approximate compositions of these glasses, in calculated weight percent on an oxide basis, are:

|  | Code 7740 | Code 7070 |
| --- | --- | --- |
| $SiO_2$ | 80.5 | 70.0 |
| $B_2O_3$ | 12.9 | 28.0 |
| $Al_2O_3$ | 2.2 | 1.1 |
| $Na_2O$ | 3.8 | — |
| $K_2O$ | 0.4 | 0.5 |
| $Li_2O$ | — | 1.2 |

While these glasses have been used since the original work at the Mallory company, it has been recognized that their properties are marginal in certain respects.

I have now discovered that the combination of properties desired for electrostatic bonding can be obtained in lithium aluminosilicate glasses. These glasses have heretofore been known as precursor glasses for glass-ceramics having beta-quartz, beta-eucryptite, or beta-spodumene crystal phases.

Lithium aluminosilicates, having CTEs in the $32-40 \times 10^{-7}/°$ C. range, resistivities at 350° C. of not over $10^6$ ohms/cm, and etchability rates in 48% HF of at least 100 $mg/cm^2$, are generally satisfactory. However, I have worked primarily with two glasses commercially melted for use in producing glass-ceramic cookware. I generally prefer these glasses because of their ready availability.

The compositions of these glasses, in calculated weight percent on an oxide basis, are set forth in TABLE I:

TABLE I

| Example | 1 (9608) | 2 (9626) |
| --- | --- | --- |
| $SiO_2$ | 69.5 | 68.2 |
| $Al_2O_3$ | 17.6 | 19.16 |
| $Li_2O$ | 2.7 | 2.80 |
| $Na_2O$ | — | 0.18 |
| $K_2O$ | — | 0.18 |
| MgO | 2.6 | 1.78 |
| ZnO | 1.0 | 1.04 |
| BaO | — | 0.75 |
| $TiO_2$ | 4.7 | 2.67 |
| $ZrO_2$ | 0.2 | 1.75 |
| $As_2O_3$ | 0.9 | 0.9 |
| $Fe_2O_3$ | 0.06 | 0.085 |
| F | 0.03 | — |
| $B_2O_3$ | 0.07 | — |
| $Nd_2O_3$ | — | 0.50 |
| $V_2O_5$ | — | 0.005 |
| $MnO_2$ | 0.03 | — |

These compositions contain colorants which are not relevant to purposes of the present invention. Also, nucleation is not involved in the present invention, so that the $TiO_2$ and $ZrO_2$ contents might be altered, or even omitted in the event the glass is specially melted. Accordingly, preferred composition ranges, based on these compositions, consist essentially of 67-71% $SiO_2$, 16-21% $Al_2O_3$, 2-3.5% $Li_2O$, 1-3.5% MgO, 0-2% ZnO, 0-5% $TiO_2$, and 0.1-1% $As_2O_3$ and/or $Sb_2O_5$.

TABLE II compares relevant properties measured on the glasses of Examples 1 and 2 of TABLE I with the same properties measured on the two currently used borosilicate glasses. In TABLE II, coefficient of thermal expansion (CTE) is reported in units $\times 10^{-7}/°$ C. as measured over the temperature range of 25°-400° C. Strain point (St.P.) is the temperature of a glass at a given viscosity, as is well recognized in the glass art. It is reported in °C. Resistivity is measured at 350° C. in ohms/cm, and is reported as the logarithm (Log R). Etchability (Etch.) is reported in $mg/cm^2$, and is the amount of glass dissolved by 48% HF in 20 minutes. Bondability (Bond.) is the applied voltage/mm of glass required to make an acceptably strong seal at the indicated temperature in °C.

TABLE II

|  | Ex.1 | Ex.2 | 7740 | 7070 |
| --- | --- | --- | --- | --- |
| CTE | 37.2 | 35.9 | 33.0 | 34.6 |
| St.P. | 640 | 655 | 510 | 456 |
| Log R. | 5.5 | 5.1 | 6.6 | 9.1 |

TABLE II-continued

|  | Ex.1 | Ex.2 | 7740 | 7070 |
|---|---|---|---|---|
| Etch. | 165 | 169 | 48 | 149 |
| Bond. | 500 @400° C. | 500 @400° C. | 1000 @450° C. | 4000 @450° C. |

Code 7740 glass has a somewhat lower CTE than silicon, which has a value of $35.3 \times 10^{-7}/°$ C. However, its major shortcoming is its low etchability rate. Code 7070 etches satisfactorily, but requires a high voltage for bonding. This is thought to be related to the high resistivity value.

It is apparent that the glasses of Examples 1 and 2 have a generally acceptable combination of properties. In particular, they combine excellent bonding conditions with good etchability and satisfactory CTE and strain point values.

I claim:

1. A composite article comprising a silicon body and a glass body electrostatically bonded directly to the silicon body, the glass having a composition consisting essentially of oxides of silicon, aluminum, and lithium, having a coefficient of thermal expansion (CTE) in the range of $32–40 \times 10^{-7}/°$ C., that has an etchability rate by 48% HF of at least 100 mg/cm$^2$ in 20 minutes, and that has a resistivity at 350° C. of not over $10^6$ ohms/cm, whereby the glass has the capability of being electrostatically bonded to silicon at a voltage not over 1,000 volts/mm and at a temperature not over 440° C.

2. A composite article in accordance with claim 1 wherein the glass has an etchability rate of at least 150 mg/cm$^2$ in 20 minutes.

3. A composite article in accordance with claim 1 wherein the glass has the capability of being electrostatically bonded to silicon at a voltage of about 500 volts/mm at a temperature of about 400° C.

4. A composite article in accordance with claim 1 wherein the glass composition, in calculated weight percent on an oxide basis, consists essentially of 62–72% $SiO_2$, 15–24% $Al_2O_3$, 0–4% MgO, 2–4.5% $Li_2O$, 0–2% ZnO, 0–5% $TiO_2$, 0–3% $ZrO_2$ and 0–2% $As_2O_3$ and/or $Sb_2O_5$.

* * * * *